United States Patent [19]

Takada

[11] Patent Number: 4,813,697

[45] Date of Patent: Mar. 21, 1989

[54] REAR FORK FOR MOTORCYCLES
[75] Inventor: Minoru Takada, Tokyo, Japan
[73] Assignee: Honda Giken Kogyo Kabushiki Kaisha, Tokyo, Japan
[21] Appl. No.: 637,198
[22] Filed: Aug. 3, 1984
[30] Foreign Application Priority Data Aug. 4, 1983 [JP] Japan .................. 59-64119

[51] Int. Cl.[4] .............................. B62K 25/20
[52] U.S. Cl. .................... 280/284; 156/91; 180/227
[58] Field of Search ........... 180/227; 156/91, 92; 280/288, 284

[56] References Cited

U.S. PATENT DOCUMENTS

| | | | |
|---|---|---|---|
| 1,262,786 | 4/1918 | Harley | 280/288 |
| 3,960,625 | 6/1976 | Simpson | 156/92 X |
| 4,061,354 | 12/1977 | Blum | 280/288 |
| 4,404,054 | 9/1983 | Dickson | 156/92 |
| 4,415,057 | 11/1983 | Yamaguchi | 180/227 |
| 4,445,585 | 5/1984 | Imani | 180/219 X |
| 4,485,885 | 12/1984 | Fukuchi | 180/227 |

Primary Examiner—Stephen Hepperle
Attorney, Agent, or Firm—Armstrong, Nikaido Marmelstein & Kubovcik

[57] ABSTRACT

A rear fork for motorcycles swingably supported at its front end portion from a body frame and supporting at its rear end portion a rear wheel axle, is built-up by interconnecting a plurality of constituent elements. The interconnection between the respective constituent elements is effected in a mutually fitted relationship with an adhesive agent interposed between their fitting surfaces, and if necessary, it is preferable to employ at the connecting portion reinforcing connection means such as rivets.

16 Claims, 7 Drawing Sheets

REAR FORK FOR MOTORCYCLES

BACKGROUND OF THE INVENTION

The present invention relates to a built-up structure of a rear fork for motorcycles, and more particularly to a built-up structure of a rear fork for motorcycles which is swingably supported at its front end portion from a body frame and supports at its rear portion a rear wheel axle.

A rear fork for motorcycles is constructed of a pair of left and right rear fork arms for supporting a rear wheel axle at their rear end portions, a cross member connecting the pair of left and right rear fork arms, and a pivot axle support member or members, and the rear fork is built-up either by welding the respective members made of steel pipes or steel sheets to each other or by welding Al-alloy extruded members, Al-alloy sheets or Al forged articles to each other. In these welded structures, the respective elements constituting the structure have an increased wall thickness in order to reinforce a lowered mechanical strength caused by welding, resulting in increase of a weight of a vehicle body and rise of a manufacturing cost. In addition, in the case of employing constituent elements made of Al-alloy, since the welding is difficult and lowering of a mechanical strength of the portions of the member material subjected to thermal influences is great, the above-mentioned tendency is more remarkable. Although a rear fork made by low-pressure casting has been commonly known as an example of use of Al-alloy material which is used contemplating reduction of a weight, the wall thickness of the product cannot be made as thin as in the case of practically worked products in view of the manufacturing process, and therefore, the effect of reducing a weight is little.

SUMMARY OF THE INVENTION

It is therefore one principal object of the present invention to provide a built-up type rear fork for motorcycles, in which upon building up by connecting respective constituent elements a mechanical strength of the element material at the connecting portion is not degraded, and moreover, which is of light weight and low cost.

Another object of the present invention is to provide a built-up structure of a built-up type rear fork for motorcycles which has various merits such that the rear fork can be built-up without necessitating specially trained skilled operatives, interconnection between constituent elements made of different materials is possibly, a reforming work after connection is unnecessary, and therefore, enhancement of a production efficiency can be contemplated.

According to one feature of the present invention, there is provided a built-up structure of a built-up type rear fork for motorcycles in which interconnection between constituent elements is effected in a mutually fitted relationship with an adhesive agent interposed therebetween.

According to another feature of the present invention, there is provided a rear fork for motorcycles having a generally H-shaped or ladder-shaped configuration, which can be produced by mutually fitting and connecting a plurality of constituent elements having an adhesive agent applied onto their fitting surfaces.

According to still another feature of the present invention, there is provided a rear fork for motorcycles formed principally of a pair of rear fork arms and a cross member interconnecting said rear fork arms and adapted to be swingably supported at its front end portion from a body frame and to support at its rear end portion a rear wheel axle, which rear fork is built-up by interconnecting, at least, the pair of rear fork arms engaging at their front end portions with a member or members on the side of the body frame, that is, a pivot axle and engaging at their rear end portions with a rear wheel axle, and the cross member, in which the interconnection between the pair of rear fork arms and the cross member is effected in a mutually fitted relationship with an adhesive agent interposed between their fitting surfaces.

The above-mentioned and other features and objects of the present invention will be more clearly understood from perusal of the following detailed description of the invention taken in conjunction with the accompanying drawings.

DESCRIPTION OF PREFERRED EMBODIMENTS

One preferred embodiment of the present invention is illustrated in FIGS. 1 to 4.

Figure 1:
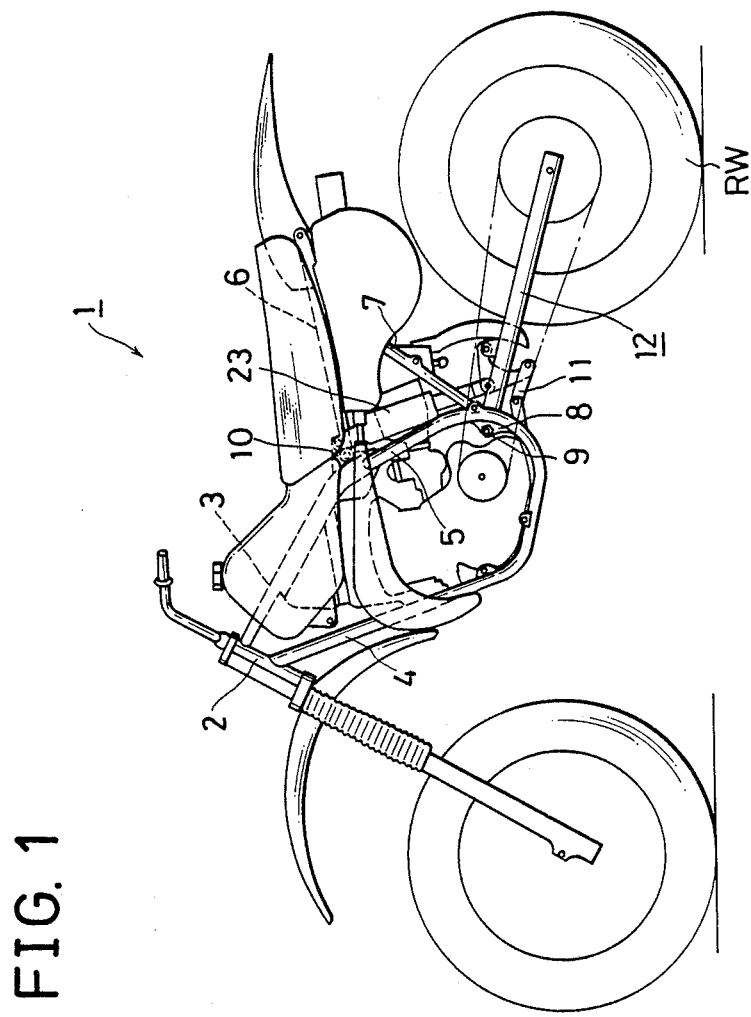
FIG. 1 is a left side elevational view of a motorcycle provided with a rear fork according to one preferred embodiment of the present invention.

A body frame of motorcycle 1 is formed so as to include a main frame structure consisting of a head pipe 2, main pipes 3 connected to the head pipe 2, down tubes 4 connected to the head pipe 2, center pillars 5 integrally formed with the down tubes 4 and connected to the main pipes 3, seat rails 6 connected to the main pipes 3, and back stays 7 connecting the center pillars 5 and the seat rails 6 with each other (See FIG. 1).

In addition, a rear fork 12 is swingably supported via pivot bolts 9 from a pair of left and right brackets 8 associated with the center pillars 5 in the proximity of their connecting portions with the above-mentioned back stays 7. The rear fork 12 can be pivotably supported either by a pair of left and right pivot bolts 9 aligned on the same pivotal axis or by a single pivot shaft supported by the pair of left and right brackets 8. Therefore, throughout this specification, a term "pivot axle" is used to generally represent such a pair of pivot bolts aligned on the same pivotal axis or a single pivot shaft. A rear cushion 23 has its top end portion supported by brackets 10 associated with the main pipe 3 and its bottom end portion supported by a link 11 connected to brackets 19 associated with the rear fork 12.

And a rear wheel RW is supported by a rear end portion of the rear fork 12.

Figure 2:
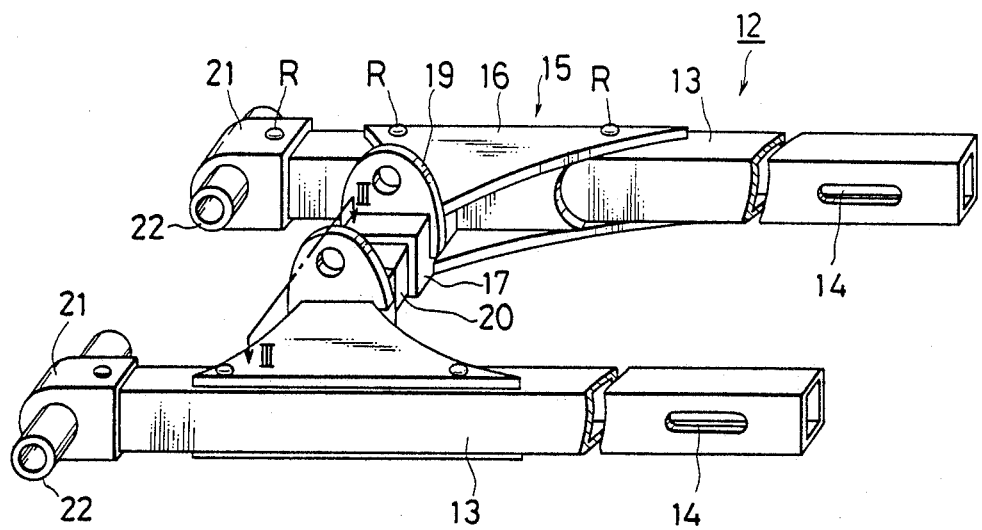
FIG. 2 is a perspective view of the rear fork shown in FIG. 1.

FIG. 2 shows the above-mentioned rear fork 12 in an appearance view. This rear fork 12 is constructed of a pair of rear fork arms 13 made of rectangular pipes, joint members 15 externally fitted and connected to the respective rear fork arms 13, a cross pipe 20 made of a rectangular pipe which is fitted in and connected to the both Joint members 15, and pivot pipe holding members 21 fitted and connected to the tip end portions of the respective rear fork arms 13, and as a whole, it presents a generally H-shaped configuration.

Figure 3:
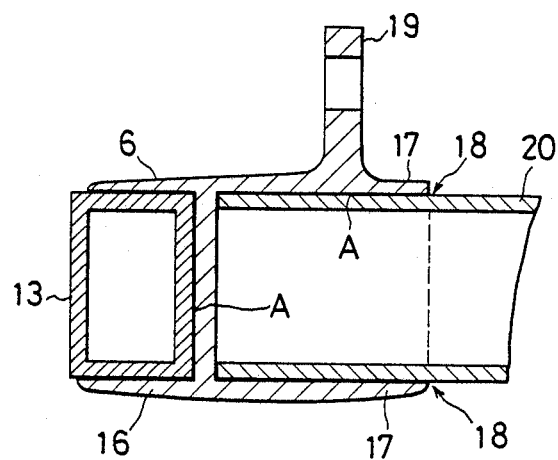
FIG. 3 is a cross-sectional view taken along the cross-section plane indicated by line III—III in FIG. 2.
Figure 4:
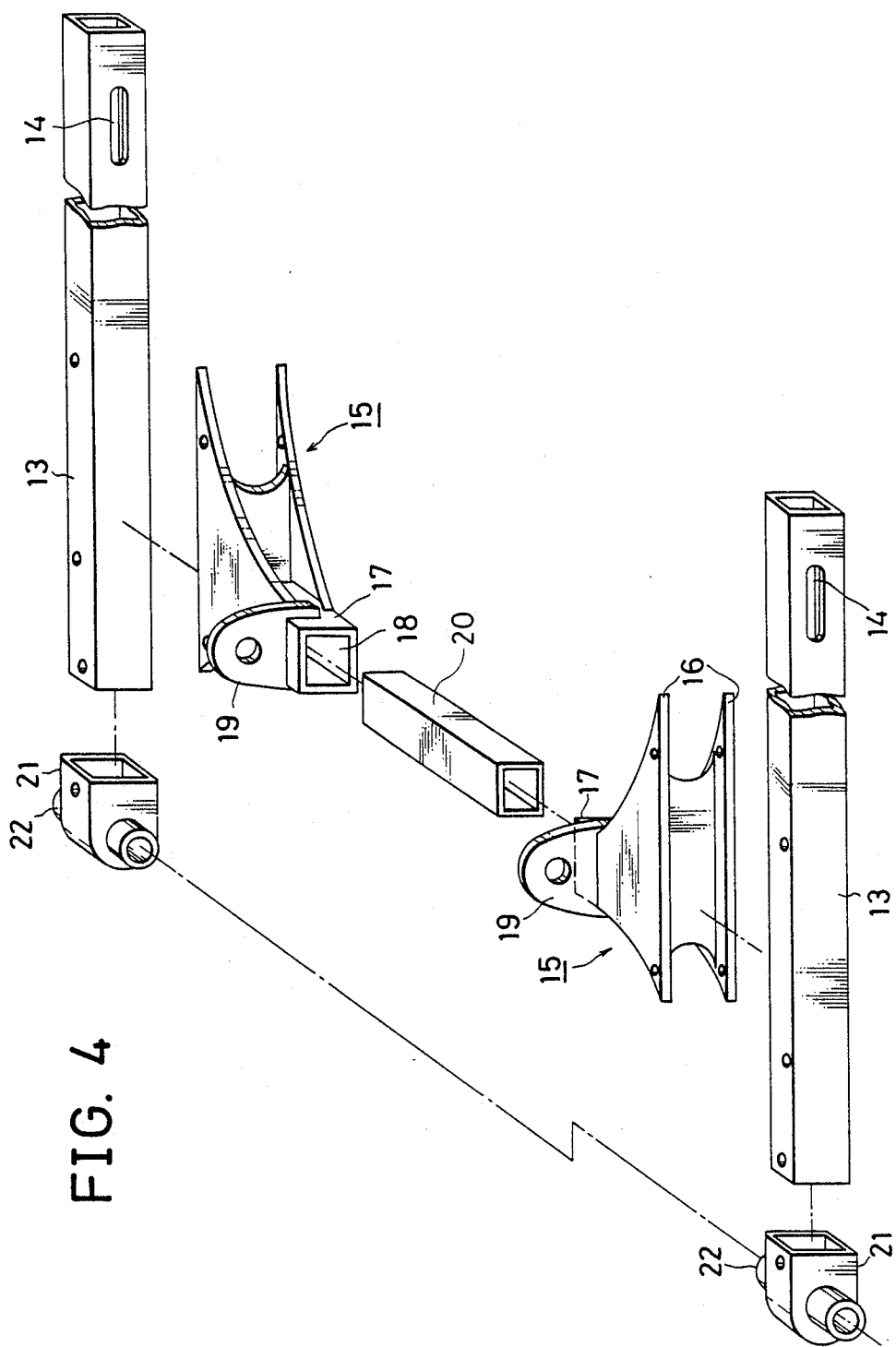
FIG. 4 is a disintegrated perspective view of the same rear fork.

The configurations of these respective constituent members are obvious from FIG. 3 (a cross-section view taken along the plane indicated by line III—III in FIG. 2) and FIG. 4 (a disintegrated perspective view of the rear fork 12).

The joint member 15 includes a rear fork arm pinching portion 16 having a U-shaped cross-section, a rectangular barrel-shaped portion 17 having a cross pipe fitting bore 18 of rectangular shape in cross-section, and a bracket 19 provided on the rectangular barrel-shaped portion as projecting therefrom, and it is integrally formed through a die casting process, a low-pressure casting process or a forging process.

In addition, at the rear end portions of the rear fork arms 13 are formed rear axle supporting holes 14, and in the pivot pipe holding member 21 to be fitted to this tip end portion of the rear fork arm 13 is integrally provided a pivot pipe 22 in which the above-described pivot bolt 9 (FIG. 1) is inserted.

Upon building up the rear fork 12, after a structural adhesive agent (epoxy resin, acrylic resin, etc.) has been applied to the inner wall surfaces of the rear fork arm pinching portions 16 and the cross pipe fitting bores 18 of the joint members 15, the respective rear fork arms 13 are fitted in the rear fork arm pinching portions 16 of the corresponding joint members 15, further the opposite end portions of the cross pipe 20 are fitted in the cross pipe fitting bores 18 of the respective joint members 15, and the tip end portions of the rear fork arms 13 are fitted into rectangular bores of the pivot pipe holding members 21 having the above-described adhesive agent applied onto the inner wall surfaces of the rectangular bores. Then, after the respective members have been coupled by means of rivets R (or pins) for the purpose of preventing displacement of the members, a curing treatment of the adhesive agent is performed. It is to be noted that the sequence of building up the rear fork 12 is not always limited to the above-mentioned procedures. In FIG. 3, bold lines A indicate adhesive agent layers.

As described above, according to the illustrated embodiment, since the pair of rear fork arms 13 are connected to each other with an adhesive agent by the cross pipe 20 via the pair of joint members 15 provided with the rear fork arm pinching portions 16 having a U-shaped cross-section, a mechanical strength of the member material is not degraded at all in distinction from welding joint, and hence sufficient reduction of weight can be achieved by eliminating a surplus wall thickness.

In addition, as a result of employment of an adhesive connecting process, it has become possible to make the respective members constituting the rear fork 12 of different metals (such as, for example, Al-alloy and steel, Al-alloy and Mg-alloy, Mg-alloy and steel, etc.), and this can greatly contribute to realization of reduction of weight as well as reduction of cost.

Furthermore, besides the merits that skilled operatives are not necessitated, thermal deformation would not occur, building up is simple and an operation efficiency is improved in distinction from a welding joint process, there is a merit that a curing treatment of an adhesive agent can be performed by making use of a baking step for a coating.

It is to be noted that since the adhesive connection surfaces between the rear fork arm pinching portion 16 having a U-shaped cross-section and the rear fork arm 13 made of a rectangular pipe are sufficiently broad, and moreover since they are connected as reinforced by the rivets R, a great mechanical strength of connection can be obtained.

Figure 5:
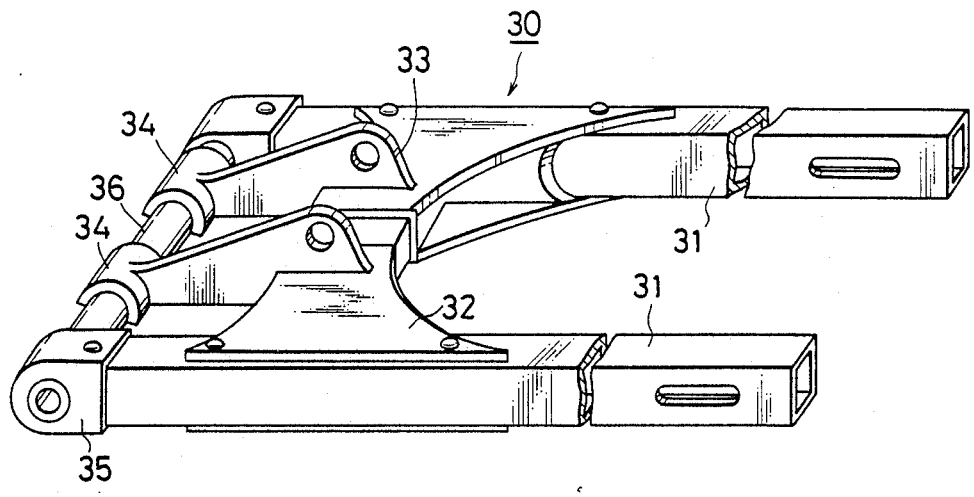
FIGS. 5 and 6 are perspective views of rear forks according to other preferred embodiments, respectively, of the present invention.

Now, description will be made on a rear fork 30 according to another preferred embodiment of the present invention illustrated in FIG. 5. This rear fork 30 presents a nearly ladder-like appearance, and while configurations and connecting relationships of rear fork arms 31, joint members 32 and pivot pipe holding members 35 are almost similar to those of the rear fork 12, the rear fork 30 is different from the rear fork 12 in the points that a pivot pipe 36 is supported by a pair of left and right pivot holding members 35 and that engaging portions 34 extended from brackets 33 of the Joint members 32 connected to the pivot pipe 36 with an adhesive agent, and because of these structural differences a mechanical strength and a rigidity of the rear fork 30 is improved as compared with the rear fork 12.

Figure 6:
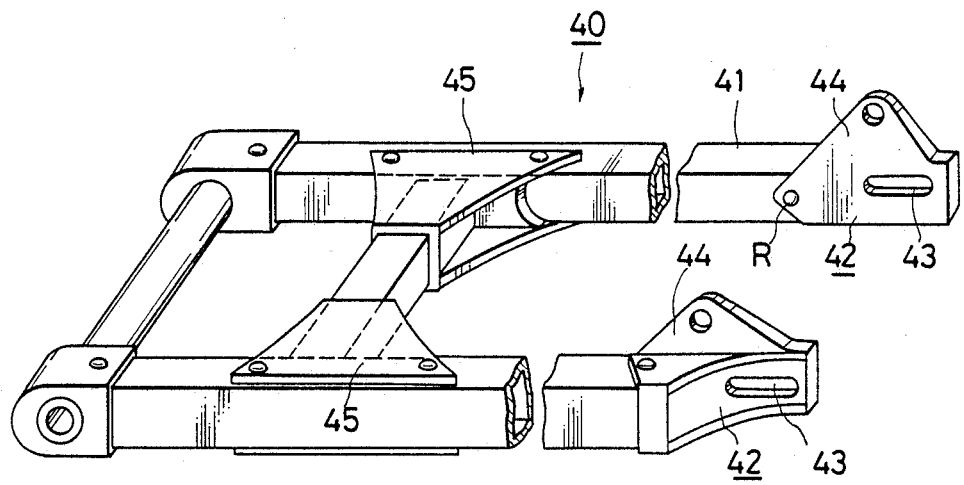
Figure 7:
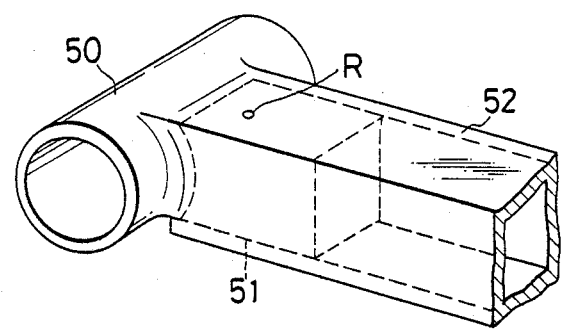
FIG. 7 is a perspective view of an essential part showing an interconnecting relationship between a rear fork arm and a pivot pipe holding member.

In addition, a rear fork 40 illustrated in FIG. 6 also presents a nearly ladder-like appearance, and in this rear fork 40, end pieces 42 provided with rear axle supporting holes 43 and brackets 44 for connecting a rear cushion 44 are fitted around rear end portions of rear fork arms 41 made of rectangular pipes and connected thereto with an adhesive agent, and also they are reinforced in connection by means of rivets R. Therefore, Joint members 45 are not associated with brackets for connecting a rear cushion.

It is to be noted that while the tip end portion of the rear fork arm was inserted into and connected to the rectangular bore of the pivot pipe holding member in the above-described embodiment, it is also possible to provide a boss 51 on a pivot pipe 50 as projecting therefrom and to eternally fit a tip end portion of a rear fork arm 52 to the boss 51 and connect them to each other with an adhesive agent.

Figure 8:
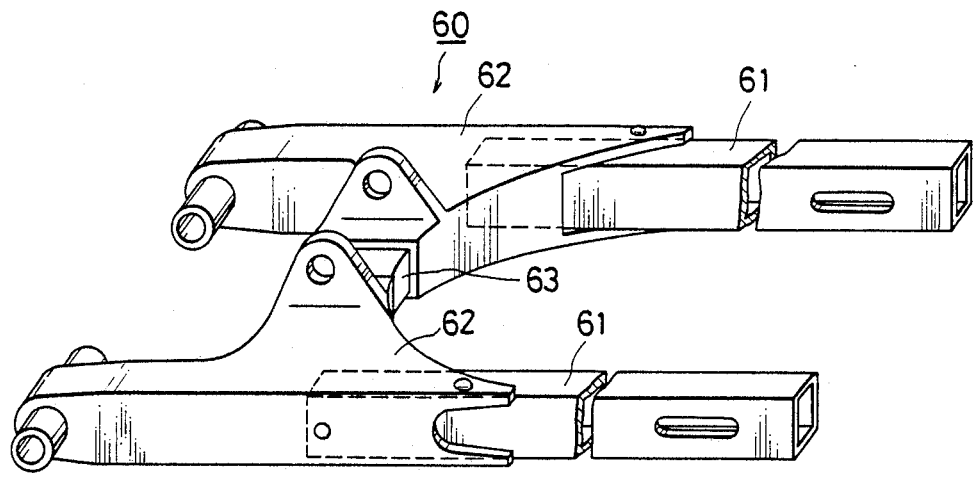
FIGS. 8 through 12 are perspective view of rear forks according to still other preferred embodiments, respectively, of the present invention.

In a rear fork 60 illustrated in FIG. 8, a front end portion of a rear fork arm main body 61 made of a rectangular pipe is fitted into a rectangular bore of a joint member 62 and jointed thereto with an adhesive agent, and the both members 61 and 62 are reinforcingly connected with rivets R. This joint member 62 is an integral piece including the joint member 15 in the rear fork 12 and the front end portion (the portion including the pivot pipe holding member 21 and the pivot pipe 22) of the rear fork arm 13, and the both joint members 62 are connected to each other by the intermediary of a rectangular cross pipe 63 under a fitting relationship between the joint members 62 and the cross pipe 63 making use of an adhesive agent. This joint member can be formed as an integral body through a die casting process, a low-pressure casting process or a forging process similarly to the joint member 15.

Figure 9:
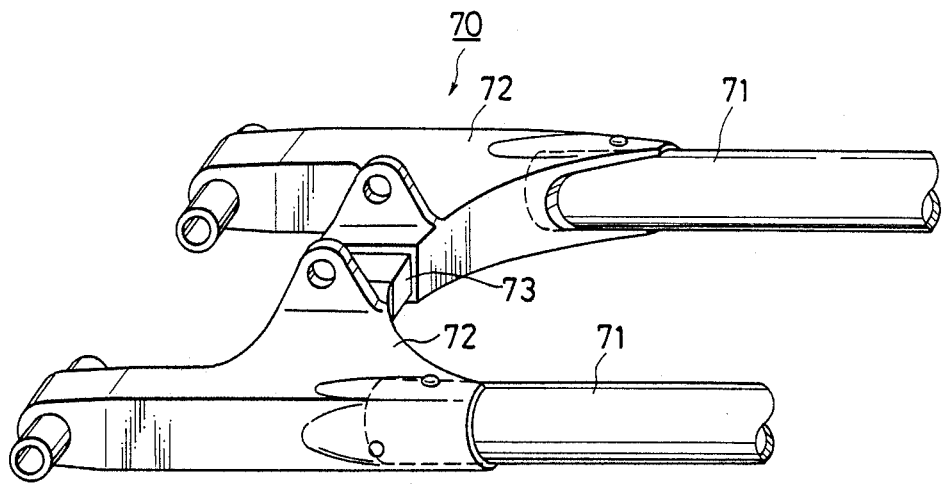

A rear fork 70 illustrated in FIG. 9 is one example of modification to the rear fork 60, and this is different from the rear fork 60 only in that a rear fork arm main body 71 is formed of a circular pipe and a fitting bore for the rear fork arm main body 71 in the joint member 72 is formed as a cylindrical bore. Digits 73 indicates a rectangular cross pipe.

Figure 10:
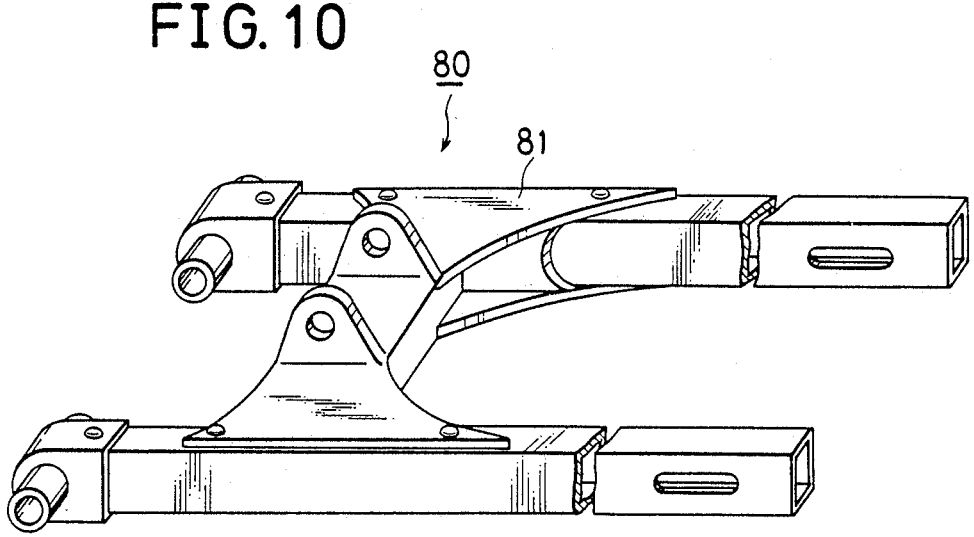

A rear fork 80 illustrated in FIG. 10 is one example of modification to the rear fork 12. In this rear fork 80, a joint member 81 is an integral piece including the pair of joint members 15 and the cross pipe 20 made of a rectangular pipe of the rear fork 12.

Figure 11:
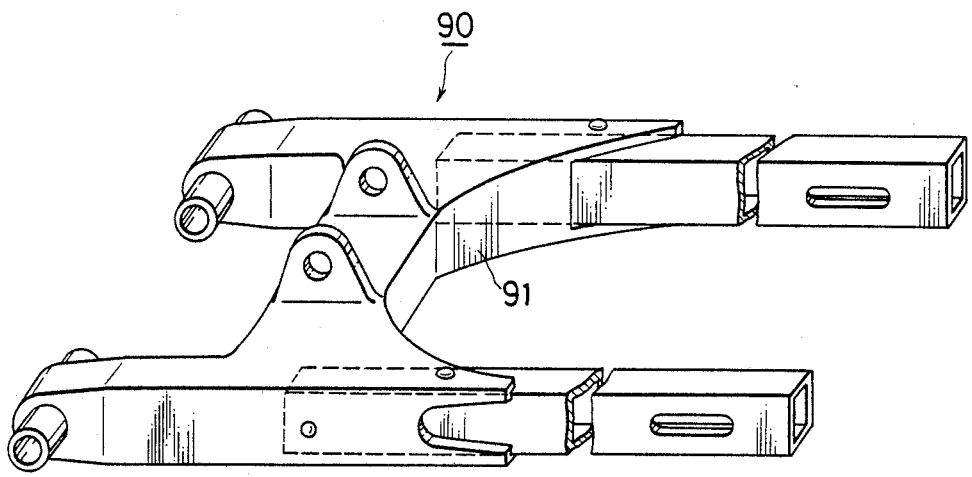

A rear fork 90 illustrated in FIG. 11 is another example of modification to the rear fork 60. In this rear fork 90, a joint member 91 is an integral piece including the pair of joint members 62 and the cross pipe 63 of the rear fork 60.

Figure 12:
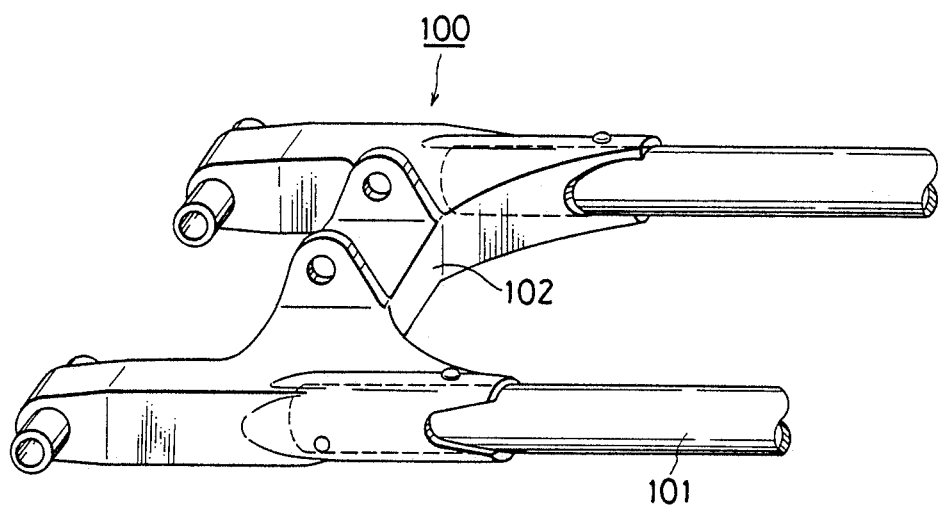

A rear fork 100 illustrated in FIG. 12 is one example of further modification to the rear fork 90. This rear fork 100 is different from the rear fork 90 only in that a rear fork arm main body 101 is formed of a circular pipe and a fitting bore for the rear fork arm main body 101 in a joint member 102 is formed as a cylindrical bore.

As will be apparent from the above description, according to the present invention there is provided a novel built-up structure making use of an adhesive agent of a rear fork for motorcycles. In this built-up structure, interconnection between the respective constituent elements are effected in a mutually fitted relationship with an adhesive agent interposed therebetween, and thereby a rear fork for motorcycles which presents a generally ladder-like appearance can be obtained. The merits attained by the present invention are firstly that even if the respective constituent elements are made of different materials they can be easily connected to each other similarly to connection between constituent elements made of the same material, secondly that a specially trained skilled operative is not necessitated for carrying out interconnection between the constituent elements, and thirdly that reduction of weight of a rear fork as well as reduction of manufacturing cost by improving a production efficiency, can be achieved.

Since many changes and modifications can be made in the above-described constructions without departing from the spirits of the present invention, it is intended that all matter contained in the above description and illustrated in the accompanying drawings shall be interpreted to be illustrative and not as a limitation to the scope of the present invention.

What is claimed is:

1. A rear fork for motorcycles formed principally of a pair of rear fork arms and a cross member interconnecting said rear fork arms and adapted to be swingably supported at its front end portion from a body frame and to support at its rear end portion a rear wheel axle, characterized in that said rear fork is built-up by interconnecting, at least, said pair of rear fork arms engaging at their front end portions with a member or members on the side of the body frame, that is, a pivotal axle and engaging at their rear end portions with a rear wheel axle, and said cross member, and the interconnection between said pair of rear fork arms and said cross member is effected in a mutually fitted relationship with an adhesive agent interposed between their fitting surfaces.

2. A rear fork as claimed in claim 1, characterized in that the interconnection between said pair of rear fork arms and said cross member is effected in a mutually fitted relationship with an adhesive agent interposed between their fitting surfaces and with the aid of reinforcing connection means such as rivets.

3. A rear fork as claimed in claim 1, characterized in that said cross member consists of a pair of joint pieces to be connected to said respective rear fork arms with an adhesive agent in a mutually fitted relationship, and a connecting element to be connected to the respective joint pieces with an adhesive agent in a mutually fitted relationship for thereby connecting the both joint pieces with each other.

4. A rear fork as claimed in claim 3, characterized in that the connecting relation between said joint piece and said rear fork arm is such relation that a portion having a U-shaped cross-section of said joint piece holds said rear fork arm between the opposed legs of the U-shaped portion.

5. A rear fork as claimed in claim 3, characterized in that said connecting element is formed of a rectangular pipe, and the opposite end portions of said connecting element are respectively fitted in rectangular barrel-shaped portions of said pairs of joint pieces and connected thereto with an adhesive agent.

6. A rear fork as claimed in claim 3, characterized in that said pair of joint pieces are respectively provided with brackets, and a rear cushion is adapted to be connected to said pair of brackets.

7. A rear fork as claimed in claim 1, characterized in that said cross member is a single joint piece connected to said respective rear fork arms with an adhesive agent under a mutually fitted relationship.

8. A rear fork as claimed in claim 1, characterized in that at the front end portions of said rear fork arms, pivot pipe holding members each integrally provided with a pivot pipe adapted to engage with a member on the body frame, that is, a pivot axle, are connected to rear fork arm main bodies with an adhesive agent under a mutually fitted relationship.

9. A rear fork as claimed in claim 1, characterized in that at the rear end portions of said rear fork arms, end pieces adapted to support the rear wheel axle and to be connected with a rear cushion are connected to rear fork arm main bodies with an adhesive agent under a mutually fitted relationshiop.

10. A rear fork as claimed in claim 1, characterized in that at the front end portions of said rear fork arms, pivot pipe holding members are connected to rear fork arm main bodies with an adhesive agent under a mutually fitted relationship, and said pair of pivot pipe holding members respectively hold the opposite end portions of a single pivot pipe.

11. A rear fork as claimed in claim 10, characterized in that said cross member is formed of a pair of joint pieces respectively connected to respective ones of said rear fork arms with an adhesive agent under mutually fitted relationship and a connecting element connected to both said joint pieces with an adhesive agent under a mutually fitted relationship for thereby connecting the both joint pieces with each other, said pair of joint pieces are respectively provided with brackets, said pair of brackets are adapted to be connected with a rear cushion, and said pair of brackets respectively extend forwards and are engaged with said pivot pipe in such manner that the engaging tip end portions of the brackets suppress the peripheral wall of said pivot pipe from the above.

12. A rear fork as claimed in claim 1, characterized in that at the front end portions of said rear fork arms, a pivot pipe adapted to engage with a member on the side of the body frame, that is, a pivot axle, is connected with an adhesive agent to the rear fork arms by fitting bosses formed integrally with the pivot pipe and having a rectangular cross-section into rectangular pipes at the tip ends of rear fork arm main bodies.

13. A rear fork for motorcycles which is swingably supported at its front end portion from a body frame and supports at its rear end portion a rear wheel axle, characterized in that said rear fork is formed, at least, of a pair of rear fork arm main bodies, a pair of joint members connected with an adhesive agent to the respective tip end portions of said rear fork main bodies under a mutually fitted relationship, and a connecting element having its opposite end portions connected with an adhesive agent to said respective joint members under a mutually fitted relationship, each of said joint members is integrally provided with an extension portion extending while presenting an appearance as if it is an extension of said rear fork arm main body and rigidly holding a pivot pipe at its tip end and a single bracket, and a rear cushion is adapted to be connected to both said brackets.

14. A rear fork as claimed in claim 13, characterized in that the interconnection between said pair of rear fork arms and said respective joint members is effected in a mutually fitted relationship with an adhesive agent interposed between their fitting surfaces and with the aid of reinforcing connection means such as rivets.

15. A rear fork for motorcycles which is swingably supported at its front end portion from a body frame and supports at its rear end portion a rear wheel axle, characterized in that said rear fork is formed, at least, of a pair of rear fork arm main bodies, and a single joint member having a generally H-shaped configuration and connected with an adhesive agent to the tip end portions of said respective rear fork arm main bodies under a mutually fitted relationship, and said joint member is integrally provided with a pair of extension portions extending while presenting an appearance as if they are extensions of said respective rear fork arm main bodies and rigidly holding pivot pipes at their tip ends, and a pair of brackets to which a rear cushion is adapted to be connected.

16. A rear fork as claimed in claim 15, characterized in that the interconnection between said pair of rear fork arm main bodies and said joint member is effected in a mutually fitted relationship with an adhesive agent interposed between their fitting surfaces and with the aid of reinforcing connection means such as rivets.

* * * * *

UNITED STATES PATENT AND TRADEMARK OFFICE
CERTIFICATE OF CORRECTION

PATENT NO. : 4,813,697
DATED : March 21, 1989
INVENTOR(S) : TAKADA

It is certified that error appears in the above-identified patent and that said Letters Patent is hereby corrected as shown below:

On the cover page, Item [30], line 2, "59-64119" should read --58-120810--.

Signed and Sealed this

Seventh Day of November, 1989

*Attest:*

JEFFREY M. SAMUELS

*Attesting Officer*     *Acting Commissioner of Patents and Trademarks*